United States Patent
Le Goff et al.

(10) Patent No.: US 10,033,244 B2
(45) Date of Patent: Jul. 24, 2018

(54) PART FOR UNCOUPLING A MOTOR AND THE MOUNTING THEREOF AND ASSEMBLY OF A MOTOR ONTO THE MOUNTING THEREOF HAVING SUCH AN UNCOUPLING PART BUILT THEREIN

(71) Applicant: Valeo Systemes Thermiques, Le Mesnil Saint Denis (FR)

(72) Inventors: Morgan Le Goff, Epinay sur Orge (FR); Saïd Naji, Elancourt (FR); Philippe Vincent, Epernon (FR); Geoffroy Capoulun, Versailles (FR); Alain Farkh, Montfort l'Amaury (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 339 days.

(21) Appl. No.: 14/774,846

(22) PCT Filed: Mar. 21, 2014

(86) PCT No.: PCT/EP2014/055688
§ 371 (c)(1),
(2) Date: Sep. 11, 2015

(87) PCT Pub. No.: WO2014/154575
PCT Pub. Date: Oct. 2, 2014

(65) Prior Publication Data
US 2016/0036292 A1 Feb. 4, 2016

(30) Foreign Application Priority Data
Mar. 26, 2013 (FR) ..................................... 13 52692

(51) Int. Cl.
*H02K 5/24* (2006.01)
*F16F 15/00* (2006.01)
(Continued)

(52) U.S. Cl.
CPC ............. *H02K 5/24* (2013.01); *F04D 29/263* (2013.01); *F04D 29/646* (2013.01);
(Continued)

(58) Field of Classification Search
CPC ............ H02K 5/24; H02K 5/161; H02K 7/04; H02K 7/09; F16F 15/1207
(Continued)

(56) References Cited

U.S. PATENT DOCUMENTS 6,236,126 B1* 5/2001 Yagi ..................... H02K 1/2786
310/156.26
6,617,719 B2* 9/2003 Sunaga .................... H02K 3/50
310/64
(Continued)

FOREIGN PATENT DOCUMENTS

WO 2012/000592 A2 1/2012

OTHER PUBLICATIONS

International Search Report issued in PCT/EP2014/055688 dated May 28, 2014 (2 pages).

*Primary Examiner* — Hanh Nguyen
(74) *Attorney, Agent, or Firm* — Osha Liang LLP

(57) ABSTRACT

A part for uncoupling a motor and a motor mounting part thereof, that includes a rigid connecting part that is to be coaxially placed in a central portion of a stator core and includes a central ring for receiving a rotatable shaft of a rotor of the motor, from which at least two arms extend, free ends of which are intended to abut against an inner wall of the stator core and form at least two spaces for placing a flexible uncoupling pad that radially extends from an outer surface of the central ring of the rigid connecting part, against which the uncoupling pad abuts, to a rigid assembly tab that is to axially extend into the central portion of the (Continued)

stator core, near the inner wall of the stator core, while being rigidly connected to the motor mounting part.

12 Claims, 4 Drawing Sheets

(51) Int. Cl.
    *F04D 29/66*     (2006.01)
    *H02K 1/18*     (2006.01)
    *F04D 29/26*     (2006.01)
    *F04D 29/64*     (2006.01)
    *F16F 15/12*     (2006.01)
    *H02K 5/16*     (2006.01)
    *H02K 7/14*     (2006.01)

(52) U.S. Cl.
    CPC ............ *F04D 29/668* (2013.01); *F16F 15/00* (2013.01); *F16F 15/1207* (2013.01); *H02K 1/187* (2013.01); *H02K 5/161* (2013.01); *H02K 7/14* (2013.01)

(58) Field of Classification Search
    USPC .......................................................... 310/51
    See application file for complete search history.

(56) References Cited

U.S. PATENT DOCUMENTS

| | | | |
|---|---|---|---|
| 6,809,898 B1 * | 10/2004 | Prochazka | ............... F16C 19/54 310/90 |
| 2008/0218009 A1 | 9/2008 | Fukuno et al. | |
| 2008/0296985 A1 | 12/2008 | Fukuno et al. | |
| 2009/0189052 A1 | 7/2009 | Naji et al. | |
| 2011/0187223 A1 | 8/2011 | Higuchi et al. | |

* cited by examiner

PART FOR UNCOUPLING A MOTOR AND THE MOUNTING THEREOF AND ASSEMBLY OF A MOTOR ONTO THE MOUNTING THEREOF HAVING SUCH AN UNCOUPLING PART BUILT THEREIN

BACKGROUND

The invention relates principally to a part for uncoupling a motor and the mounting thereof.

The invention further relates to the assembly of a motor onto the mounting thereof having such an uncoupling part built therein.

Ventilation, heating and/or air conditioning systems in vehicles, in particular motor vehicles, involve the propulsion of an airflow through a fan wheel which is driven by a motor placed in a mounting fixed to the body of the vehicle.

To limit the transmission of vibrations from the motor it is known to provide vibration dampers, otherwise called uncoupling means, produced from a flexible material such as rubber and located between the motor and the mounting thereof.

The publication WO 201200592 discloses such a system in which three uncoupling pads are regularly distributed between the inner ring of the motor mounting, the motor being housed in the region thereof, and an intermediate circular wall of the motor mounting.

However, in such a configuration, and in particular when the motor is in the horizontal position, the operation of the motor may lead to the deformation of the flexible uncoupling pads and the tilting of the motor to the front which may have a negative effect on the aeraulic performances of the fan, in particular, due to possible contact with a fan wheel.

The publication US 2008/0218009 provides an uncoupling system arranged in the motor about a central part which is connected to the motor mounting extending coaxially in the central part of the core of the stator. This uncoupling system thus makes it possible to absorb the vibrations produced by the stator. However, the noise of the motor is not satisfactorily reduced.

SUMMARY OF DISCLOSURE

In this context, the present invention relates to a part for uncoupling a motor and the mounting thereof, permitting the vibrations caused by the operation of the motor to be reduced significantly, whilst avoiding the displacement of the motor, and in particular the tilting thereof in the horizontal position.

To this end, the uncoupling part of the invention is characterized in that it comprises a rigid connecting part which is designed to be coaxially arranged in the central part of the core of the stator and which comprises a central ring for receiving the rotating shaft of the rotor of the motor, at least two arms extending therefrom, and the free ends thereof being designed to bear against the inner wall of the core of the stator and forming at least two spaces for housing a flexible uncoupling pad extending radially from the outer face of the central ring of the rigid connecting part, the uncoupling pad bearing in the region thereof, as far as a rigid assembly tab designed to extend axially in the central part of the core of the stator in the vicinity of the inner face of said core of the stator and being fixed to the motor mounting.

The uncoupling part of the invention may also comprise the following optional features, considered individually or according to all possible technical combinations:

- the uncoupling pads each comprise at least one axial recess.
- at least one axial recess is produced in the region of the contact surface between the uncoupling pads and the central ring of the connecting part, thus forming a discontinuity of the contact surface between said uncoupling pads and the central ring of the connecting part.
- the uncoupling pads are H-shaped, incorporating two lateral through-recesses.
- the rigid connecting part comprises three arms regularly distributed circumferentially about the central ring, forming three spaces for housing the flexible uncoupling pads.
- the rigid connecting part comprises four arms which are regularly distributed circumferentially about the central ring and which form four spaces for housing the flexible uncoupling pads.
- the uncoupling pads are made of rubber.
- the lateral edges of the rigid assembly tabs are folded back toward the axis of rotation of the rotating shaft of the rotor, coming into engagement with the relevant uncoupling pad.
- each opposing free end of the rigid connecting part comprises a housing for receiving a first and a second bearing designed to be coaxially arranged in the central part of the core of the stator, by being in rotational contact with the rotating shaft of the rotor.
- the uncoupling part is produced by overmolding the uncoupling pads between the rigid connecting part of the uncoupling part and the assembly tabs fixed to the mounting part.

The invention further relates to an assembly of a motor on the mounting thereof, which is characterized in that it comprises a uncoupling part as disclosed above, which is fitted into the central part of the stator core by being fixed to the motor mounting, the radial ends of the arms of the rigid connecting part of the uncoupling part bearing against the inner wall of the core of the stator, whilst the assembly tabs of the uncoupling pads are substantially remote from said inner wall of the core of the stator.

Advantageously, the transverse median plane of the uncoupling part which extends coaxially in the central part of the core of the stator is aligned with the center of gravity of the motor.

Further features and advantages of the invention will emerge more clearly from the description which is provided below, by way of indication and in a non-limiting manner, with reference to the accompanying figures, as seen below.

DETAILED DESCRIPTION

Figure 1:
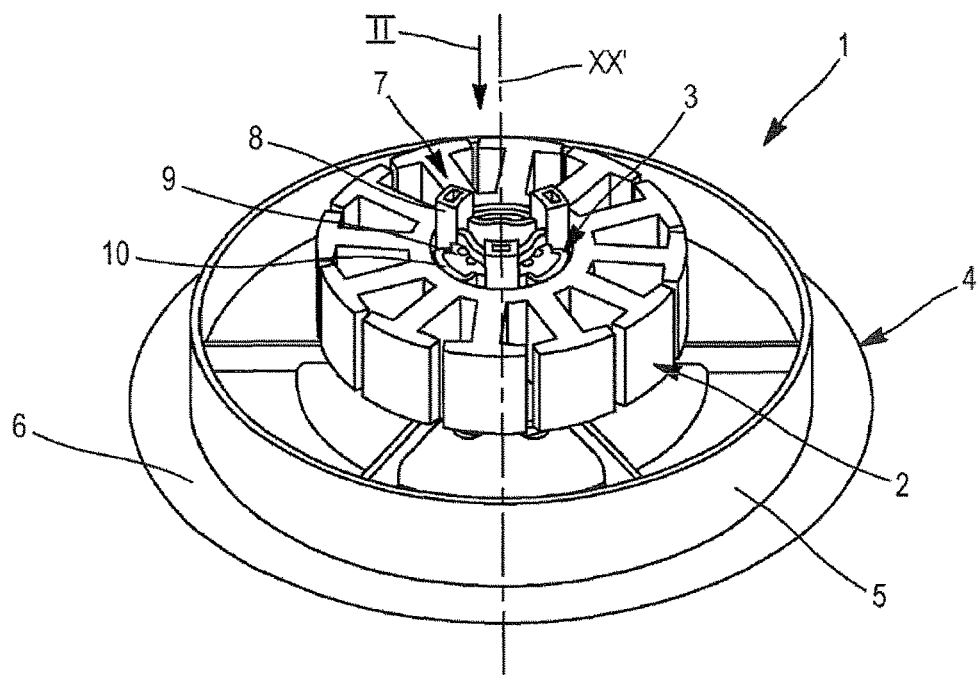
FIG. 1 is a schematic view in perspective of the uncoupling part of the invention according to a first variant, said uncoupling part being fitted into the central part of the core of the stator of a motor shown partially.

With reference to FIG. 1, a motor 1 shown partially comprises a stator core 2, a central part 3 thereof being designed to receive an uncoupling part 7 mounted coaxially about a rotating shaft of a rotor, not shown in this figure. The stator core 2 has a certain thickness such that the central part 3 of the stator core 2 extends axially along a axis of rotation XX' of the rotating shaft of the rotor.

A motor mounting part 4 of the motor 1 extends transversely and remotely from the stator core 2, having a dish-shaped part 5 forming a receiver for the motor 1 and an essentially planar disk-shaped part 6. The motor mounting part 4 is fixed to a body of a vehicle (not shown).

The uncoupling part 7 is coaxially fitted into the central part 3 of the stator core 2 and comprises a rigid connecting part 8, uncoupling pads 9 and assembly tabs 10 fixed to the motor mounting part 4. The uncoupling pads 9 are produced from a flexible and resilient material, for example rubber.

Figure 2:
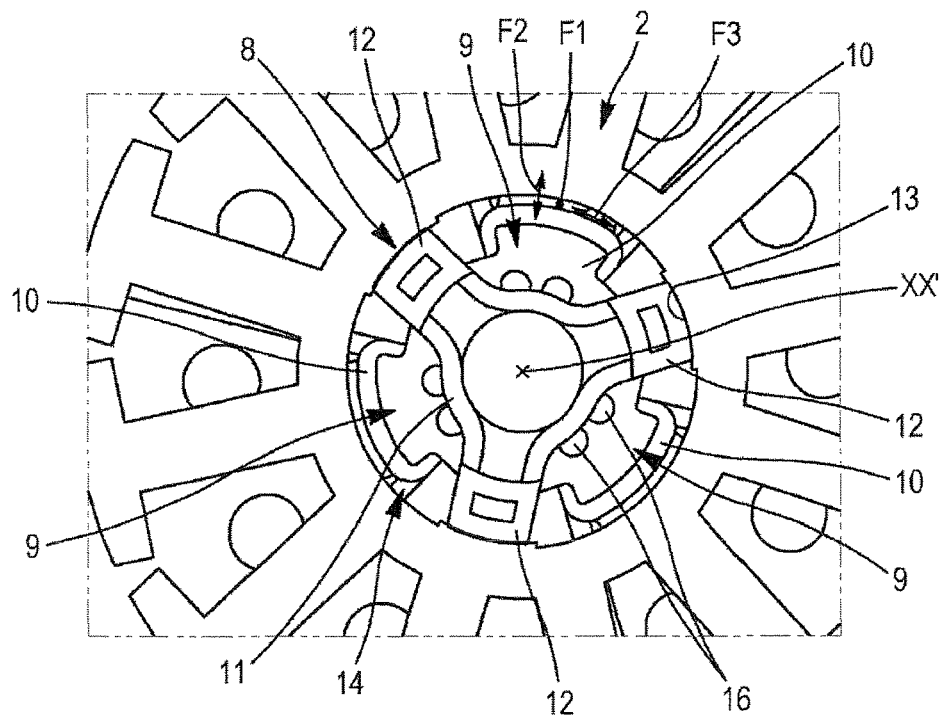
FIG. 2 is a schematic plan view from above of the uncoupling part of the invention according to the arrow II of FIG. 1.
Figure 3:
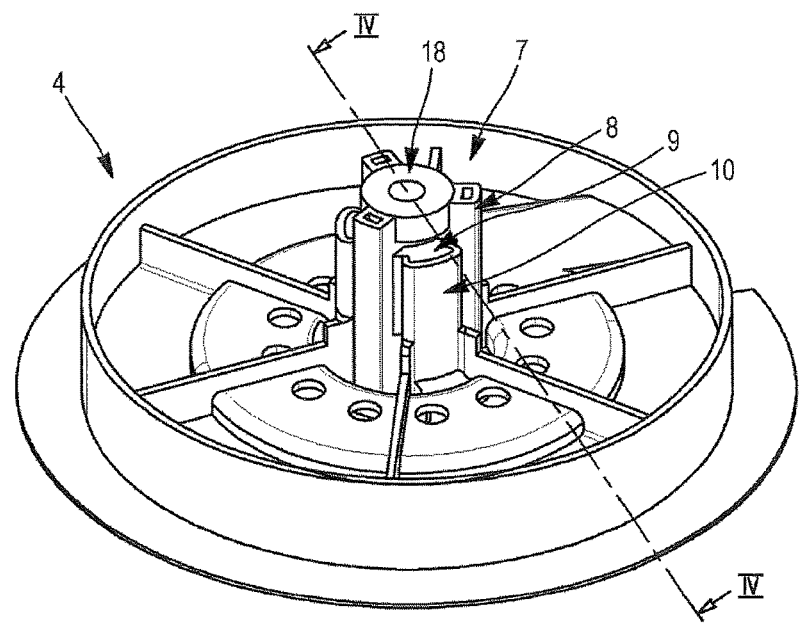
FIG. 3 is a schematic view in perspective of the uncoupling part of the first variant shown on the motor mounting and overmounted by a bearing accompanying the rotation of the rotor.
Figure 4:
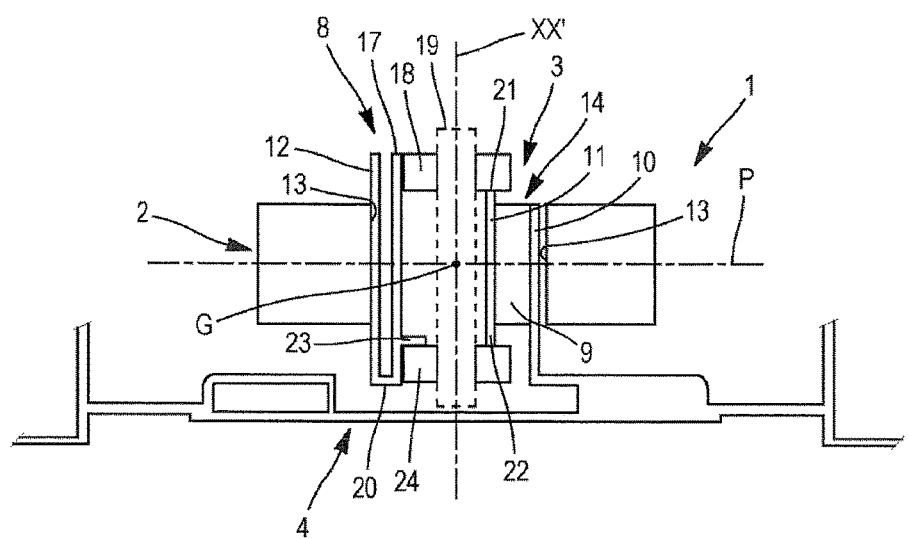
FIG. 4 is a schematic view in section along the line IV-IV of FIG. 3 in which the core of the stator is illustrated.

With reference to FIGS. 2 to 4, the rigid connecting part comprises a coaxial central ring 11, three arms 12 regularly distributed circumferentially extending radially therefrom and free ends thereof bearing radially against an inner wall 13 of the stator core 2.

Each pair of adjacent arms 12 forms a space 14 for housing the uncoupling pad 9 forming a vibration damper, which extends radially from an outer face of the coaxial central ring 11 of the rigid connecting part 8 as far as an assembly tab 10, lateral edges thereof being folded back toward the axis XX', coming into engagement with the vibration damper (See 9 in FIG. 2).

With reference to FIG. 4, each assembly tab 10 extends axially in the central part 3 of the stator core 2 as far as the motor mounting part 4 to which it is fixed. Moreover, each assembly tab 10 extends radially in the vicinity of the inner wall 13 of the stator core 2 without bearing against this inner wall 13. This distance between each assembly tab 10 and the stator core 2 makes it possible to permit the relative movements of the stator core 2 relative to the motor mounting part 4 during the operation of the motor 1.

As visible in FIG. 2, each uncoupling pad 9 comprises two axial through-recesses 16 located in the region of the contact surface between the uncoupling pad 9 and the central ring 11 of the rigid connecting part 8.

Thus, with reference to FIG. 4, the uncoupling part 7 extends axially in the central part 3 of the stator core 2, the uncoupling pads 9 having a height which coincides with a height of the stator core 2. Thus, a transverse median plane P of the uncoupling part 7 is aligned with a center of gravity G of the motor 1 which confers advantageous properties to the uncoupling part 7 of the invention which will be described hereinafter.

More specifically, if the uncoupling pads 9 each have a length which is substantially identical to a thickness of the stator core 2, the rigid connecting part 8 extends axially on both sides of the stator core 2. As visible in FIGS. 3 and 4, an upper free axial ends 17 of the arms 12 of the rigid connecting part 8 extend at a certain distance from the stator core 2 whilst an upper end 21 of the central ring 11 extends at a shorter distance from the stator core 2, forming a bearing surface of a first bearing 18 for driving in rotation the rotating shaft of the rotor 19. The bearing 18 thus bears axially against the central ring 11 and bears radially against the three arms 12 of the rigid connecting part 8.

With reference to FIG. 4, lower free axial ends 20 of the arms 12 of the rigid connecting part 8 extend at a certain distance from the stator core 2 whilst a lower end 22 of the central ring 11 extends at a shorter distance from the stator core 2. Moreover, the lower end of each arm 12 of the rigid connecting part 8 comprises a recess 23 located at the same distance from the stator core 2 as the lower free end 22 of the central ring 11, thus forming with the lower free end 22 of the central ring 11, a bearing surface of a second bearing 24 for driving in rotation the rotating shaft of the rotor 19. The second bearing 24 also bears radially against the lower ends 20 of the three arms 12 of the rigid connecting part 8.

According to the invention, the uncoupling part 7 which comprises the rigid connecting part 8, the uncoupling pads 9 and the assembly tabs 10 fixed to the motor mounting part 4 is produced by overmolding.

Moreover, the uncoupling part 7 is mounted in the stator core 2 by forcibly fitting the rigid connecting part 8 against the inner wall 13 of the stator core 2 and then fixing the assembly tabs 10 to the motor mounting part 4.

The required rigidity between a stator and the rotor is obtained by the uncoupling part 7, due to the respective rigidities of the rigid connecting part 8 which bears rigidly against the stator core 2, and the assembly tabs fixed to the motor mounting part 4. This results in the uncoupling part 7 forming a rigid connection. Moreover, the required coaxiality between the stator and the rotor is also obtained by the coaxial fixed retention of the rigid connecting part 8 in the stator core 2 and the presence of bearings 18 and 24 positioned fixedly relative to the rigid connecting part 8 by the means disclosed above.

Moreover, in contrast to the prior art set forth above and, in particular, disclosed in the publication WO201200592, by attaching the uncoupling pads 9 in the very center of motor 1, the median uncoupling plane P and the center of gravity G of the motor 1 are aligned which makes it possible to avoid any displacement of the motor 1 during operation relative to the motor mounting part 4 due to the deformation of the uncoupling pads 9.

Moreover, in contrast to the system of the publication US2008/0218009 cited above, the positioning of the uncoupling part 7 between the rotor and the stator core 2 results in the corresponding uncoupling of these two elements, the rotor and stator.

Moreover, the absorption of the vibrations of the motor 1 by the uncoupling pads 9 responds to precise conditions. More specifically, the axial arrangement of the vibration pads (see 9 in FIG. 2) which extend in the central part 3 of the stator core 2 and the radial arrangement of these vibration pads 9 between the rigid connecting part 8 and the assembly tabs 10 permit the axial F1 and radial F2 (FIG. 2) deformations caused by operation of the motor 1 to be limited.

In contrast, the longitudinal through-recesses 16 located in the region of the contact surface between the uncoupling pads 9 and the central ring 11 of the rigid connecting part 8, limit the contact surface between these vibration pads (see 9 in FIG. 2) and this central ring 11 in a tangential direction F3 (FIG. 2), which permits the uncoupling pads 9 to absorb the tangential vibrations resulting from rotational jolts of the stator relative to the fixed parts of the system.

The configuration of the uncoupling part 7 thus permits both the stator and the rotor to be isolated, maximum vibrations being absorbed before being transmitted to a instrument panel in the case of an application to a motor vehicle (not shown) and this taking place without resulting in the tilting of the motor 1.

It is also noteworthy that large contact surfaces in the axial F1 and radial F2 directions of the uncoupling pads 9 with the rigid parts of the uncoupling part 7 also permit the tilting of the motor 1 to be limited in the case of horizontal positioning.

Figure 5:
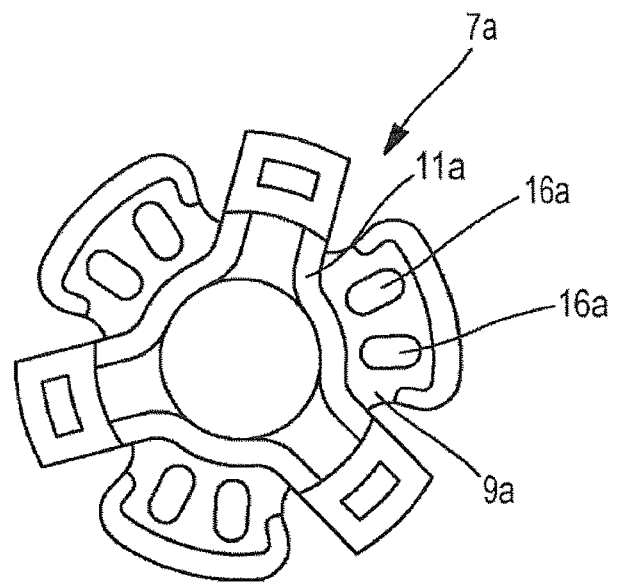
FIG. 5 is a schematic view from above of the uncoupling part of the invention according to a second variant.
Figure 6:
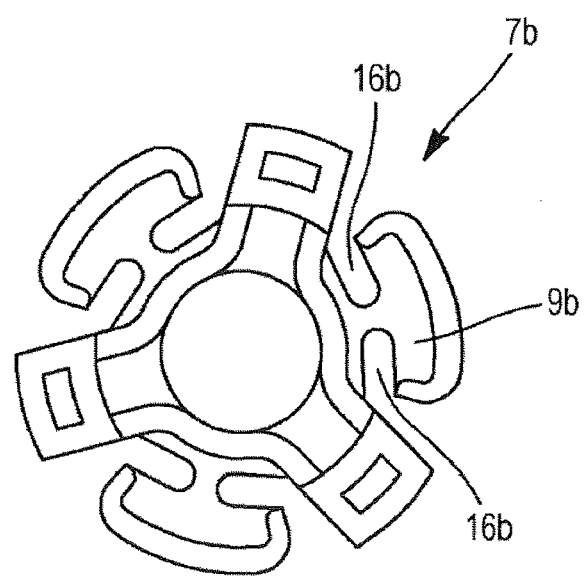
FIG. 6 is a schematic view from above of the uncoupling part of the invention according to a third variant.

With reference to FIGS. 5 and 6, the uncoupling pads (9a, 9b) of the uncoupling part (7a, 7b) of the invention may have various possible configurations.

In particular, as illustrated in FIG. 5, the axial through-recesses 16a of the uncoupling pads 9a of the uncoupling part 7a may be formed in a thickness of the uncoupling part 7a and remotely from the central ring 11a of the uncoupling part 7a.

As an advantageous alternative illustrated in FIG. 6, it is possible for the uncoupling pads 9b of the uncoupling part 7b not to have through-recesses but to be H-shaped, thus incorporating the lateral through-recesses 16b which permit the relative tangential movements between the motor and the mounting thereof.

Figure 7:
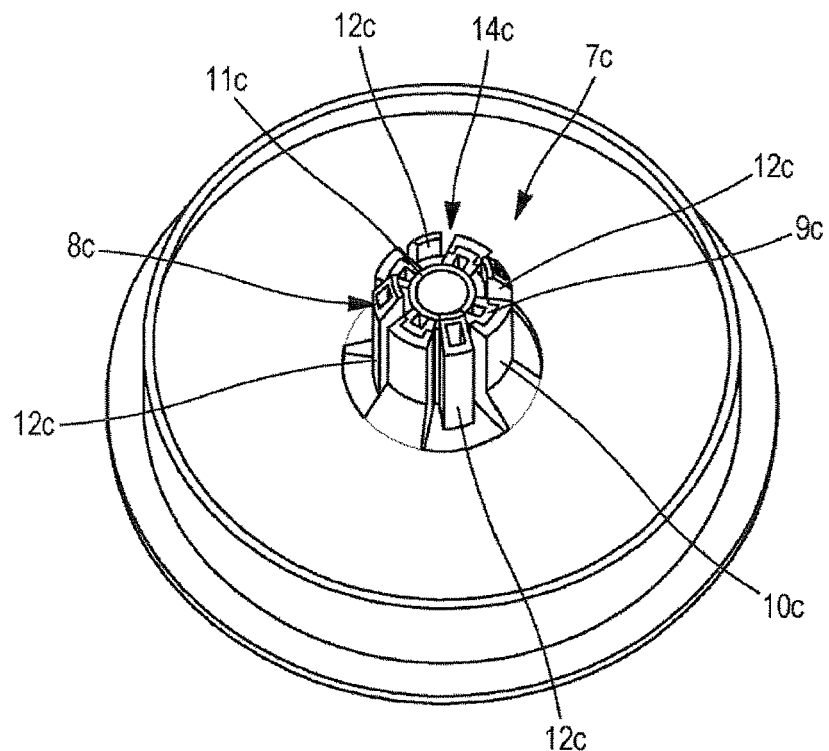
FIG. 7 is a schematic view in perspective from above of the uncoupling part of the invention according to a fourth variant, said uncoupling part being shown mounted on the motor mounting.

Moreover, with reference to FIG. 7, the uncoupling part 7c of the invention may comprise a connecting part 8c comprising four radial arms 12c regularly distributed circumferentially about the central ring 11c, and thus defining four housings 14c for receiving four uncoupling pads 9c overmounted radially by their assembly tab 10.

Figure 8:
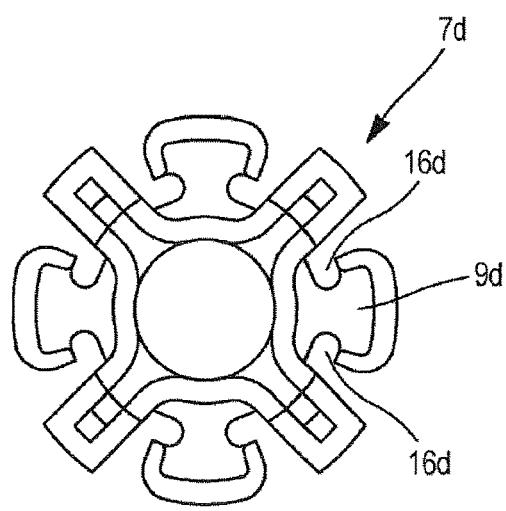
FIG. 8 is a schematic view from above of the uncoupling part of the invention according to a fifth variant.

Finally, as illustrated in FIG. 8, in this configuration with four arms, the uncoupling pads 9d of the uncoupling part 7d may also be H-shaped, incorporating the lateral through-recesses 16b, which permit the relative tangential movements between the motor and the mounting thereof.

The geometry of the uncoupling part of the invention is not limited to the exemplary embodiments described above, since this uncoupling part may comprise a minimum of two arms of the connecting part and the connection pads are able to be of any appropriate configuration.

What is claimed:

1. An uncoupling part designed to be arranged between a motor and a motor mounting part thereof, comprising:
   a rigid connecting part which is designed to be coaxially arranged in a central part of a stator core and which comprises a central ring for receiving a rotating shaft of a rotor of the motor;
   at least two arms extending therefrom, and a free ends thereof being designed to bear against an inner wall of the stator core and forming at least two spaces for housing a flexible uncoupling pad extending radially from an outer face of the central ring of the rigid connecting part,
   the flexible uncoupling pad bearing in a region thereof, as far as a rigid assembly tab designed to extend axially into the central part of the stator core in a vicinity of an inner face of said stator core and being fixed to the motor mounting part.

2. The uncoupling part as claimed in claim 1, wherein the flexible uncoupling pads each comprise at least one axial recess.

3. The uncoupling part as claimed in claim 2, wherein at least one axial recess is produced in a region of a contact surface between the flexible uncoupling pads and the central ring of the rigid connecting part, thus forming a discontinuity of the contact surface between said flexible uncoupling pads and the central ring of the rigid connecting part.

4. The uncoupling part as claimed in claim 1, wherein the flexible uncoupling pads are H-shaped, incorporating two lateral through-recesses.

5. The uncoupling part as claimed in claim 1, wherein the rigid connecting part comprises three arms regularly distributed circumferentially about the central ring, forming three spaces for housing the flexible uncoupling pads.

6. The uncoupling part as claimed in claim 1, wherein the rigid connecting part comprises four arms which are regularly distributed circumferentially about the central ring and which form four spaces for housing the flexible uncoupling pads.

7. The uncoupling part as claimed in claim 1, wherein the flexible uncoupling pads are made of rubber.

8. The uncoupling part as claimed in claim 1, wherein a lateral edges of the rigid assembly tabs are folded back toward the axis of rotation of the rotating shaft of the rotor, coming into engagement with a relevant uncoupling pad.

9. The uncoupling part as claimed in claim 1, wherein each opposing free end of the rigid connecting part comprises a housing for receiving a first and a second bearing designed to be coaxially arranged in the central part of the stator core, by being in rotational contact with the rotating shaft of the rotor.

10. The uncoupling part as claimed in claim 1, wherein the uncoupling part is produced by overmolding uncoupling pads between the rigid connecting part of the uncoupling part and the assembly tabs fixed to the motor mounting part.

11. The uncoupling part as claimed in claim 1, wherein radial ends of the arms of the rigid connecting part of the uncoupling part bear against the inner wall of stator core, whilst the rigid assembly tab of the flexible uncoupling pad are remote from said inner wall of the stator core.

12. The uncoupling part as claimed in claim 11, wherein a transverse median plane of the uncoupling part which extends coaxially in the central part of the stator core is aligned with a center of gravity of the motor.

* * * * *